Figure 1:
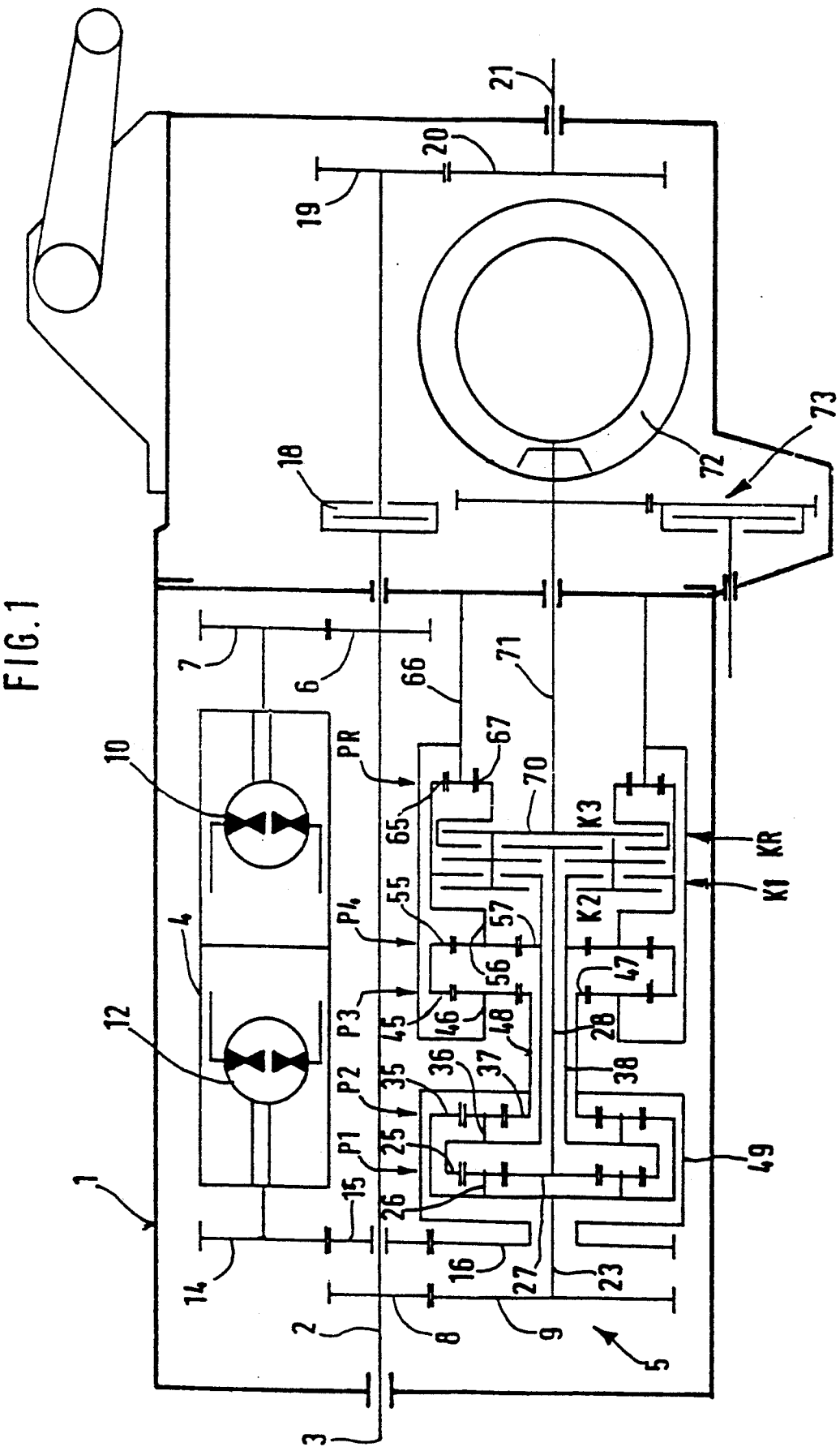

United States Patent [19]

Nikolaus et al.

[11] Patent Number: 5,159,855

[45] Date of Patent: Nov. 3, 1992

[54] CONTINUOUSLY VARIABLE DRIVING UNIT OF A MOTOR VEHICLE

[75] Inventors: Heinrich Nikolaus, Hamburg; Robert Paton, Neukirchen am Inn, both of Fed. Rep. of Germany

[73] Assignee: Zahnradfabrik Friedrichshafen AG, Fed. Rep. of Germany

[21] Appl. No.: 778,821

[22] PCT Filed: Jul. 7, 1990

[86] PCT No.: PCT/EP90/01105

§ 371 Date: Dec. 19, 1991

§ 102(e) Date: Dec. 19, 1991

[87] PCT Pub. No.: WO91/01460

PCT Pub. Date: Feb. 7, 1991

[30] Foreign Application Priority Data

Jul. 14, 1989 [DE] Fed. Rep. of Germany ....... 3923225

[51] Int. Cl.5 ............................................. F16H 59/74
[52] U.S. Cl. ........................................ 74/850; 74/844; 475/78
[58] Field of Search ...................... 74/844, 850; 475/78

[56] References Cited

U.S. PATENT DOCUMENTS

| | | |
|---|---|---|
| 4,561,328 | 12/1985 | Hiramatsu . |
| 4,754,664 | 7/1988 | Dick ................... 475/81 |
| 4,840,092 | 6/1989 | Sakaguchi et al. . |
| 4,983,149 | 1/1991 | Kita ................... 475/79 X |
| 5,011,463 | 4/1991 | Jarchow et al. ........... 475/78 X |
| 5,052,987 | 10/1991 | Hagin et al. ........... 475/74 X |
| 5,080,637 | 1/1992 | Tenberge et al. ........... 475/81 |

FOREIGN PATENT DOCUMENTS 2049843 12/1980 United Kingdom .

*Primary Examiner*—Dirk Wright
*Attorney, Agent, or Firm*—Davis, Bujold & Streck

[57] ABSTRACT

The invention concerns a continuously variable driving unit motor vehicles having a controllable internal combustion engine and a hydrostatic-mechanical power split transmission with continuously variable reduction ratio, wherein the transmission is set to the lowest possible resistance when the driving unit is started and when the vehicle is stationary with the internal combustion engine running or during a warm-up period, the motor vehicle does not move unintentionally.

5 Claims, 2 Drawing Sheets

CONTINUOUSLY VARIABLE DRIVING UNIT OF A MOTOR VEHICLE

The invention concerns a continuously variable driving unit of a motor vehicle according to the features of the preamble of claim 1.

German Patent 29 18 448 has disclosed a continuously variable power split transmission consisting of two parts. One contains a continuously variable hydrostatic and a mechanical transmission branch which are permanently connected with a coupling transmission having several shafts. The other transmission part is a selector transmission which acts upon the main output shaft. The coupling shafts alternatively drive the selector transmission. The changes of gear take place at synchronous speeds free of load and without interruption in the tractive force. The transmission acts like a continuous transmission with a large range of adjustment and allows a vehicle to operate the internal combustion engine along a curve for minimum fuel consumption, thus making possible the saving of fuel.

At the starting point, the hydrostatic branch of the transmission is adjusted to the maximum displacement and a clutch connects the coupling shaft for the first forward or reverse driving range with the main output shaft at a zero synchronous speed resulting from the sum of the opposite speeds of the output shafts of the hydrostatic branch and of the shaft of the mechanical branch of the transmission. At zero speed of the coupling shafts of the first forward and of the reverse drive range, the coupling shaft of the second forward drive range reaches a maximum speed. If the displacement is throttled, the speed of the output shaft of the hydrostatic branch and the speed of the coupling shaft of the second drive range decrease and reach synchronous speed with the increasing speed of the coupling shaft of the first drive range at maximum volume and reversed direction of displacement.

Since no starting clutch is provided, the internal combustion engine and the hydrostatic-mechanical transmission part must be jointly driven by a starter for the initial operation of the driving unit. The power needed for driving the transmission part and the internal combustion engine determines the dimensions of the starter and the electrical network of the motor vehicle.

In order to keep the total resistance of the driving unit low, the resistance of both the internal combustion engine and the transmission must be kept as low as possible.

Hydrostatic-mechanical power split transmissions have a high idle power in the presence of a large displacement in the hydrostatic branch. The displacement is determined by the angle of the swash plate of the primary unit. Therefore, the power needed for driving is dependent, among other things, on the angle of the swash plate of the primary unit.

Resistance additionally results from the drag effect in the disengaged clutches between the rotating coupling shafts and the drive shaft. Since independently of the displacement in the hydrostatic transmission branch, the sum of the speeds of all coupling shafts is more than zero, a drag resistance due to friction and viscosity stands opposed to the elements of the selector clutch such as discs. At low temperatures, the drag resistance increases since the lubricating capacity of the transmission oil is low at an elevated viscosity.

Due to the drag effect the drive shaft of the transmission can be driven and the vehicle set in motion, without control, even with quite disengaged clutches.

For reasons in the technique of measurement and adjustment, a precise permanent preservation of a speed of the coupling shafts is not ensured. Therefore, when the clutch is engaged between main output shaft and a coupling shaft which should be set to zero speed, the motor vehicle does not remain stationary with certainty but can move unintentionally.

The problem on which the invention is based consists in providing a continuous power split transmission which has a small resistance when the driving unit is first started and wherein in addition an unintended motion of the motor vehicle, when parked with a running engine or during a warm-up period, is ruled out.

According to the invention this is obtained by the fact that during a starting operation the displacement of the hydrostatic branch is adjusted to a minimum and after the driving unit has been started, at least two shiftable elements are connected with the output shaft of the transmission.

With the device according to the invention there is additionally obtained the advantage that a starter with low power is sufficient to start the driving unit whereby the expenses can be reduced in the whole electric network of the motor vehicle. The adjustment of the swash plate of the hydrostatic unit from minimum to maximum displacement makes possible the closing of the selector clutches immediately after the starter is no longer actuated and shortens the warm-up period. In case of a large displacement in the hydrostatic branch, more oil is moved and thereby heating is quicker thus more quickly increasing the lubricating capacity and reducing the viscosity of the oil. When the clutch of the first forward drive range is engaged and the brake of the first reverse drive range is engaged, the output shaft of the transmission is set to zero independently of the deflections from the zero speed in the coupling shafts determined by techniques of measurement and adjustment.

Other advantageous features and structural embodiments of the object of the main claim can be understood from sub-claims 2 to 5.

The embodiments of the invention are shown in the drawings.

FIG. 1: a diagrammatic illustration of a first version of the transmission.

Figure 2:
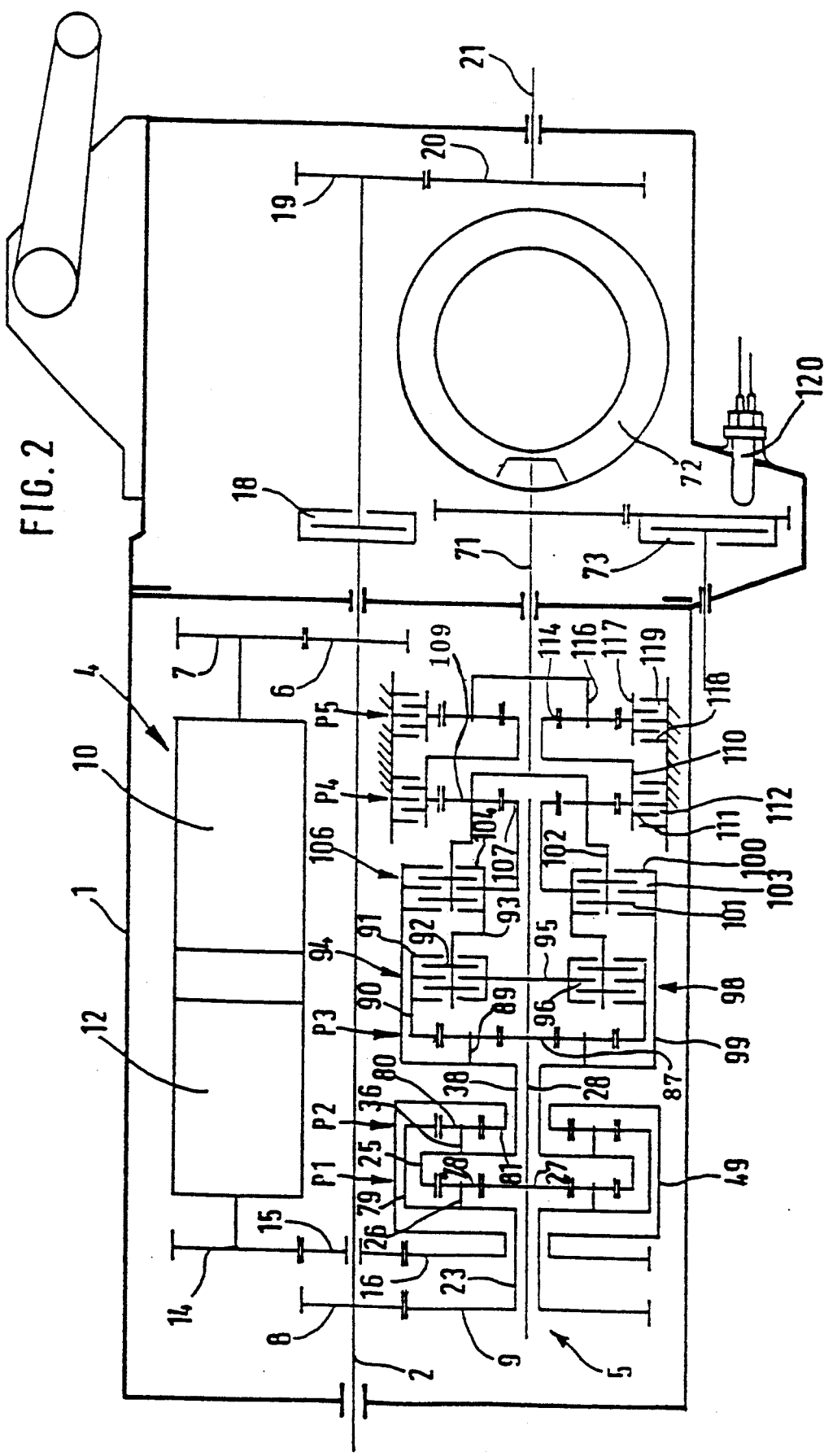

FIG. 2: a diagrammatic illustration of a second version of the transmission.

According to FIG. 1, an input shaft 2, which on the input side at 3 is coupled with an internal combustion engine not shown, is supported in a housing. A hydrostatic power branch 4 and a mechanical power branch 5 are situated in the housing 1 concentrically about the input shaft 2. A gear 6 is connected with the input shaft 2 and meshes with a gear 7 to drive the hydrostatic power branch 4. A gear 8, which is connected with the input shaft 2 and meshes with the gear 9, drives the mechanic power branch 5.

The hydrostatic power branch 4 consists of a primary hydrostatic engine 10, especially an axial piston engine whose displacement is continuously variable, the swivel angle of the adjustment member being adjustable starting from zero in the negative and positive directions. The engine 10 is hydraulically connected with a secondary hydrostatic engine 12. Said engine 12 has a constant displacement and is designed, for instance, as an axial piston engine. The engine 12 is connected via gears 14, 15, 16 with the mechanical power branch 5.

The input shaft 2 is lengthened on the output side and connected, via a gearshift clutch 18 and gears 19 and 20, with a power take off shaft 21. In agriculture and other working machines, the power take off shaft 21 serves to drive additional devices.

The hydrostatic and the mechanical power branches 4, 5, brought together in five planetary gear sets P1 to P4 and PR, are attached to the clutches K1 to K3 and KR of the selector transmission.

The planet carrier 26 of the first planetary gear set P1 and the annular gear 35 of the second planetary gear set P2 form, with an intermediate shaft 23 and the gear 9 of the input shaft 2, the mechanical power branch 5.

The annular gear 25 of the first planetary gear set P1 and the planet carrier 36 of the second planetary gear set P2 are connected with each other and via an annular shaft 38 with the sun gear 57 of the fourth planetary gear set P4 and with the clutch K2. The sun gear 27 of the first planetary gear set P1 is connected with the clutch K3 via a centric shaft 28. The sun gear 37 of the second planetary gear set P2 is connected with the sun gear 47 of the third planetary gear set P3 via an annular shaft 48. In addition, the hollow shaft 48 is connected, via a drive bell 49 which engages over the planetary gear sets Pl and P2, with the gear 16 which is attached to the hydrostatic power branch 4.

The planet carrier 46 of the third planetary gear set P3 is securely disposed to the housing. The planet carrier 56 of the fourth planetary gear set P4 is connected with the clutch K1 and with the annular gear 65 of the fifth planetary gear set PR. The annular gears 45 and 55 of the planetary gear sets P3 and P4 are connected with each other.

The planet carrier 66 of the fifth planetary gear set PR is securely disposed to the housing while the sun gear 67 can be connected via the clutch KR with the disc carrier 70. The direction of rotation of the sun gear 67 is opposite to the planet carrier 56.

All clutches have a common disc carrier 70 on the output side which is connected with the output shaft 71 which drives an axle differential 72 of a rear axle. If necessary, another front-axle differential not shown can be connected via a clutch 73.

The first and second planetary gear sets Pl and P2 form a summarizing transmission with an input of shaft 2 and an input of the hydrostatic power branch 4. The planetary gear sets P3 and P4 likewise form a summarizing transmission. The planetary gear set PR serves to reverse the gear in a reverse speed of the vehicle. The output shaft 71 is connectable with the planetary gear sets via the clutches. In a given transmission geometry, final speed and spreading action of the speed ranges, two summarizing transmissions are needed to reach zero speed on one of the coupling shafts. The planetary gear sets P1 to P4, the clutches K1 to K3 and KR, the same as the planetary gear set PR, are disposed axially adjacent each other in the indicated sequence. For this the input shaft 2 and both engines of the hydrostatic power branch 4 are situated concentrically in the housing 1.

When the driving unit is stationary, the primary unit 10 in the hydrostatic branch 4 of the power split transmission is set at zero displacement. During the operation of the internal combustion engine by a starter (not shown), the swash plate of the primary unit 10 remains in said position. When the internal combustion engine is running without assistance of an outside force by the starter and the motor vehicle is stationary, the clutches K1 and KR are engaged after the primary unit 10 has been set at a maximum displacement. The transmission output shaft 71 is blocked, since a rotation movement of the planet carrier 56 actuates the disc carrier 70 in an opposite direction of rotation.

The KR is released for forward speed and the engine 10 is reset starting from the maximum adjustment.

For the reverse gear R, the clutch K1 is released starting from parking and KR remains engaged. The power flows via the planetary gear sets P2, P3, P4 and PR to the output shaft 71.

The version of the transmission according to FIG. 2 differs from the above described transmission by the coupling transmission and the mechanical selector transmission. The numbering for corresponding parts is like that of the transmission version of 1.

The coupling transmission contains two three-shaft planetary gear sets P1 and P2. The input shaft 23 of the mechanical power branch 5 is connected with a planet carrier 26 of the planetary gear set P1. The planetary gear set P1 contains planets 78. The input shaft 23 is firmly connected with an annular gear 79 of the second planetary gear set P2. The planetary gear set P2 contains planets 80. The input shaft 16 is firmly connected with a sun gear 81 of the second planetary gear set P2. A sun 27 of the first planetary gear set P1 is secured on a coupling shaft 28. A planetary carrier 36 of the second planetary gear set P2 is connected with an annular gear 25 of the planetary gear set P1 and a coupling shaft 38. The coupling shafts 28 and 38 are connected with a second coupling transmission which has a planetary gear set P3. A sun 87 of said planetary gear set P3 is connected with the sun 27 of the first planetary gear set P1 and the planet carrier 36 of the second planetary gear set P2 is connected with a planet carrier 89 of the planetary gear set P3 via the coupling shaft 38.

External discs 91 of a clutch 94 are non-rotatably mounted on an annular gear 90 of the planetary gear set P3. Said external discs 91 grip between internal discs 92 which are non-rotatably on a shaft 93.

On the coupling shaft 28 is mounted a clutch carrier 95 which engages a clutch 98 via non-rotatable external discs 96 between the internal discs 92 non-rotatable mounted on the shaft 93.

External discs 100 of a clutch 103 are non-rotatable mounted on an intermediate shaft 99 firmly connected with the coupling shaft 38. Said external discs grip between internal discs 101 which are non-rotatable mounted on a shaft 102.

The shaft 93 contains non-rotatable external discs 104 which engage between internal discs 101 of a clutch 106.

The shaft 93 is firmly connected with a sun 107 of planetary gear set P4. The shaft 102 carries planets 109 of the planetary gear set P4. An annular gear 110 of the planetary gear set P4 is connectable via discs 111 of a brake 112 with the transmission housing 1. The shaft 102 is firmly connected with a transmission output shaft 71. The annular gear 110 of the planetary gear set P4 is firmly connected with a sun 114 of a planetary gear set P5. A planet carrier 116 of the planetary gear set P5 is firmly connected with the transmission output shaft 71. An annular gear 117 of the planetary gear set P5 can be connected via discs 118 of a brake 119 with the transmission housing 1.

Mode of operation:

When the drive unit is stationary, the engine 10 in the hydrostatic branch 4 of the power split transmission 1 is set to zero displacement. During the operation of the internal combustion engine by a starter (not shown), the engine 10 remains in this position.

The engine 10 and the input shaft 2 are driven proportionally to the speed of the internal combustion engine. If the internal combustion engine runs without outside force by the starter, the engine is accelerated by adjusting the displacement of the engine 10 and the annular gear 90 of the planetary gear set P3 is brought to zero speed by summing the speeds of the input shafts 16, 23 in the planetary gear sets P1, P2 and P3.

In order to block the transmission output shaft 71, the brakes 112, 119 are jointly engaged. The brakes 112, 119 can be engaged independently of the displacement in the engine 10 and of the speed of the annular gear 90, since the planetary gear sets P4 and P5 can be separated from the coupling transmissions P1, P2 and P3 by the clutches 94, 98, 103.

To travel disengaged, the clutch 94 engages. If the brake 119 is disengaged, the first forward speed range is engaged. If the brake 119 remains engaged and the brake 112 disengaged, the first reverse speed range is engaged.

A temperature sensor 120 is mounted, at a place adequate for measuring the oil temperature in the transmission, which is connected with an adjusting device (not shown) of the transmission. At low oil temperatures, said sensor 120 can give a signal to an acoustic or optic monitoring device on the selector switch (not shown) and/or control the adjusting device so that only a limited operation or no operation is possible until the oil has exceeded a minimum temperature.

REFERENCE NUMERALS

1—housing
2—input shaft
4—hydrostatic power branch
5—mechanical power branch
6—gear
7—gear
8—gear
9—gear
10—hydrostatic engine
12—hydrostatic engine
14—gear
15—gear
16—gear
18—gearshift clutch
19—gear
20—gear
21—power take off shaft
P1—planetary gear set
P2—planetary gear set
P3—planetary gear set
P4—planetary gear set
PR—planetary gear set
K1—clutch
K2—clutch
K3—clutch
KR—clutch
23—intermediate shaft
26—planet carrier
27—sun gear
28—shaft
35—annular gear
36—planet carrier
37—sun gear
38—annular shaft
45—annular shaft
46—planet carrier
47—sun gear
48—annular shaft
49—drive bell
55—annular gear
56—planet carrier
66—planet carrier
67—sun gear
70—disc carrier
71—output shaft
72—axle differential
73—clutch
78—planets
79—annular gear
80—planets
81—sun gear
87—sun
89—planetary gear carrier
90—annular gear
91—external discs
92—internal discs
93—shaft
94—clutch
95—clutch carrier
96—external discs
98—clutch
99—intermediate shaft
100—external discs
101—internal discs
102—shaft
103—clutch
104—external discs
106—clutch
107—sun
110—annular gear
111—discs
112—brake
114—sun
116—planetary gear carrier
117—annular gear
118—discs
119—brake
120—temperature sensor

We claim:
1. A continuously variable driving unit with a power split for motor vehicles, especially tractors and other working machines,
   in which via a power take off a hydrostatic power branch (4) and a mechanical power branch (5) are driven by an input shaft (2),
   in which said hydrostatic power branch (4) has a constantly variable primary hydrostatic engine (10) and a secondary hydrostatic engine (12),
   in which said hydrostatic and said mechanical power branches (4, 5) are brought together in a coupling transmission of a planetary design and
   in which at maximum displacement in said hydrostatic branch (4) the sum of speeds from mechanical and hydrostatic transmission branches (4, 5) results in a zero speed on one of the output shafts of said coupling transmission (56, 90), characterized in that during a starting operation, displacement in said hydrostatic branch (4) is adjusted to a minimum and after starting said driving unit, shift ele- ments for two speed ranges are connected with said transmission output shaft (71).

2. A driving unit according to claim 1, characterized in that clutches (K1, KR) connected said transmission output shaft (71) with a coupling shaft (56) when the motor vehicle is stationary.

3. A driving unit according to claim I, characterized in that said shiftable elements are brakes (112, 119) which connect said transmission output shaft (71) with the transmission housing.

4. A driving unit according to claim 1, characterized in that the displacement of said primary engine (10) is increased in said hydrostatic branch (4) after starting said driving unit.

5. A driving unit according to claim 1, characterized in that a sensor (120) measures the temperature of the transmission oil and said transmission output shaft (71) remains connected with said shiftable elements until the temperature of the transmission oil has exceeded a minimum temperature.

* * * * *